United States Patent
Sakaguchi et al.

(10) Patent No.: US 6,886,711 B2
(45) Date of Patent: May 3, 2005

(54) HIGH-PRESSURE TANK AND METHOD FOR FABRICATING THE SAME

(75) Inventors: Teppei Sakaguchi, Osaka (JP); Yoshiki Sakaguchi, Carson, CA (US)

(73) Assignee: Samtech Corporation, Osaka (JP)

( * ) Notice: Subject to any disclaimer, the term of this patent is extended or adjusted under 35 U.S.C. 154(b) by 266 days.

(21) Appl. No.: 10/225,463

(22) Filed: Aug. 22, 2002

(65) Prior Publication Data

US 2004/0035870 A1 Feb. 26, 2004

(51) Int. Cl.⁷ .................................................. F17C 1/06
(52) U.S. Cl. ................................. 220/560.04; 220/581
(58) Field of Search ............................... 220/4.13, 623, 220/601, 560.09, 560.05, 560.04, 561, 567.1, 584, 567.2, 585, 581, 4.12

(56) References Cited

U.S. PATENT DOCUMENTS

| | | | | |
|---|---|---|---|---|
| 2,026,133 A | * | 12/1935 | Mapes | 220/581 |
| 2,744,043 A | * | 5/1956 | Ramberg | 156/155 |
| 3,557,827 A | * | 1/1971 | Marsh | 137/590 |
| 3,653,846 A | * | 4/1972 | Kubec et al. | 422/148 |
| 4,360,116 A | * | 11/1982 | Humphrey | 220/586 |
| 4,579,242 A | * | 4/1986 | Ellis, III | 220/4.13 |
| 5,413,230 A | * | 5/1995 | Folter et al. | 215/5 |
| 6,135,308 A | * | 10/2000 | Fang | 220/590 |
| 6,227,402 B1 | * | 5/2001 | Shimojima et al. | 220/581 |
| 6,241,116 B1 | * | 6/2001 | Schrepfer et al. | 220/581 |

FOREIGN PATENT DOCUMENTS

JP                3251216           4/1999

* cited by examiner

Primary Examiner—Joseph Man-Fu Moy
(74) Attorney, Agent, or Firm—Nixon Peabody LLP; Donald R. Studebaker

(57) ABSTRACT

In a high-pressure tank 1 in which a gas discharge section 5 is extended from one end of a cylindrical section 2 through a dome section 4 by plastically deforming a short hollow cylindrical blank of metal, the gas discharge section 5 is set at a thickness at least three times that of the cylindrical section 2, and the dome section 4 is gradually increased in thickness from that of the cylindrical section 2 to that of the gas discharge section 5 in proceeding from the cylindrical section 2 to the gas discharge section 5. Thereby, a high-pressure tank capable of withstanding higher pressures than used at the present time is provided easily and at low cost.

1 Claim, 4 Drawing Sheets

HIGH-PRESSURE TANK AND METHOD FOR FABRICATING THE SAME

BACKGROUND OF THE INVENTION (1) Field of the Invention

This invention relates to improvements of a high-pressure tank into which high-pressure gas is charged and improvements of a method for fabricating the same.

(2) Description of the Related Art

In high-pressure tanks into which gas, such as natural gas or hydrogen gas, is charged and stored at high pressure, stress is concentrated at a gas discharge section and a dome section continuous therewith. Therefore, when the dome section and the gas discharge section protruding from the dome section are formed by necking a predetermined region of an elongated hollow cylindrical blank continuing from its opening end by means of spinning, they are increased in thickness as compared with the cylindrical section of the tank.

In this connection, the applicant filed a patent application on a method for forming a dome section and a gas discharge section by flow forming the predetermined region of the elongated hollow cylindrical blank continuing from its opening end into a larger thickness than the other region and then necking the thickened predetermined region through spinning, and has already obtained a patent for the method (see Japanese Patent Publication No. 3251216).

For the conventional general fabrication method described above, however, there is a limit to how much the thickness of the gas discharge section and the dome section can be increased because of the use of an elongated hollow cylindrical blank having a uniform thickness as a whole. For example, as shown in FIG. 3 as Comparative Example 1, with a tank obtained using an elongated hollow cylindrical blank 111 having a cylindrical section about 3.3 mm thick, even a gas discharge section 5, which is the thickest of all tank parts, has a thickness of only about 7.1 mm or about twice that of the cylindrical section 2. The resultant tank is difficult to adapt as a high-pressure tank 1 capable of withstanding further increased high pressures that would be expected in future.

To cope with this, as shown in FIG. 4 as Comparative Example 2, it can be considered to ensure the thickness of a gas discharge section 5 and a dome section 4 by increasing the thickness of an entire cylindrical section of an elongated hollow cylindrical blank 111 to about 7.6 mm, for example (in this case, the thickness of the gas discharge section 5 will be about 14.2 mm). In this case, however, the entire high-pressure tank 1 thus fabricated will also be thickened and thereby increased in weight, which hinders weight reduction. In addition, since the tank uses the thick elongated hollow cylindrical blank 111, its material cost will be high.

On the other hand, for the first-mentioned example disclosed in the Publication, since the predetermined region of the elongated hollow cylindrical blank continuing from the opening end is increased in thickness as compared with the other region, the portions which will serve as the gas discharge section and the dome section can have a predetermined thickness with certainty and the entire tank weight can be reduced by thinning the cylindrical section. In this example, however, since the portions which will serve as the gas discharge section and the dome section have a uniform thickness as a whole, the amount of reduction of the blank will be large. This may invite the complete closure of the gas discharge section and thereby necessitate subsequent boring of a gas outlet in a later process step, which requires extra labor.

It should be noted that the references assigned to the respective elements in FIGS. 3 and 4 correspond to the references assigned to respective elements in an embodiment of the present invention.

SUMMARY OF THE INVENTION

The present invention has been made in view of the foregoing points and therefore its object is to provide, easily and at low cost, a high-pressure tank capable of withstanding higher pressures than used at the present time.

To attain the above object, the present invention is characterized in that the rate of thickness of the gas discharge section and the dome section to that of the cylindrical section is raised and that the portion of the blank corresponding to the gas discharge section and the dome section varies in thickness.

More specifically, the present invention is directed to a high-pressure tank in which a gas discharge section is extended from one end of a cylindrical section through a dome section by plastically deforming a short hollow cylindrical blank of metal and to its fabrication method, and takes the following measures.

The invention relates to the first-mentioned high-pressure tank, and is characterized in that the gas discharge section is set at a thickness at least three times that of the cylindrical section, and the dome section is gradually increased in thickness from that of the cylindrical section to that of the gas discharge section in proceeding from the cylindrical section to the gas discharge section.

With the above structure, in the invention since the gas discharge section is set at a thickness at least three times that of the cylindrical section and the dome section is gradually decreased in thickness from the gas discharge section and continues to the cylindrical section, the strengths of the gas discharge section and the dome section are ensured. This provides a high-pressure tank sufficient to withstand higher pressures than used at the present time. Furthermore, the cylindrical section is thin, but the gas discharge section and the dome section are thickened to ensure the tank strength. Therefore, according to the reduced thickness of the cylindrical section, the weight of the entire high-pressure tank can be reduced and the material cost can be reduced.

The invention relates to the second-mentioned high-pressure tank fabrication method, wherein the invention is characterized by comprising the steps of: flow forming the short hollow cylindrical blank of metal to form an elongated hollow cylindrical blank in which at least one end of the cylindrical section is open and a predetermined region starting from the opening end is gradually increased in thickness in proceeding from the other region to the opening end; and then necking the predetermined region starting from the opening end of the elongated hollow cylindrical blank by spinning to form the dome section and the gas discharge section extending from the dome section so that the dome section is gradually increased in thickness from that of the cylindrical section to that of the gas discharge section in processing from the cylindrical section to the gas discharge section.

With the above structure, in the invention, the thickness of the predetermined region starting from the opening end of the elongated hollow cylindrical blank is gradually changed according to the thicknesses of the gas discharge section and the dome section. Therefore, the amount of reduction of the blank by spinning need not be so much, which enables the gas discharge section to be formed without being completely closed and eliminates the gas outlet boring step. As a result, a high-pressure tank capable of withstanding higher pressures than used at the present time can be fabricated easily and at low cost.

The invention is characterized in that the gas discharge section is set at a thickness at least three times that of the cylindrical section.

With this structure, in the invention the effects can be obtained with certainty.

DESCRIPTION OF PREFERRED EMBODIMENT

Hereinafter, an embodiment of the present invention will be described with reference to the drawings.

Figure 2A:
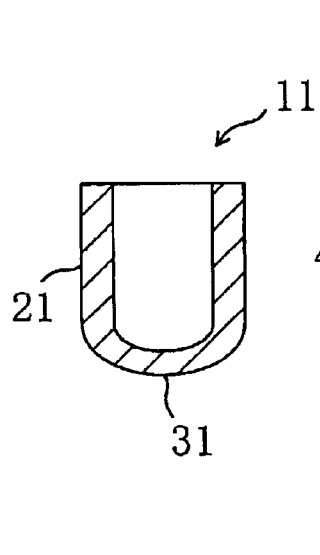
FIG. 2 shows process steps of a high-pressure tank fabrication method according to the embodiment of the present invention, wherein 2A is a cross-sectional view of a short hollow cylindrical blank serving for flow forming, 2B is a view showing a flow forming process step, and 2C is a view showing a spinning process step.
Figure 2B:
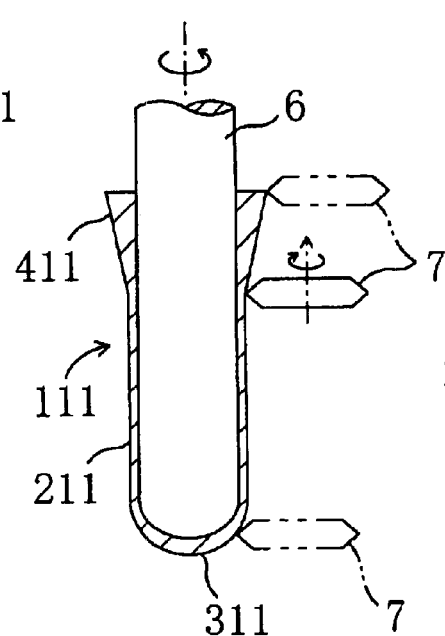
Figure 2C:
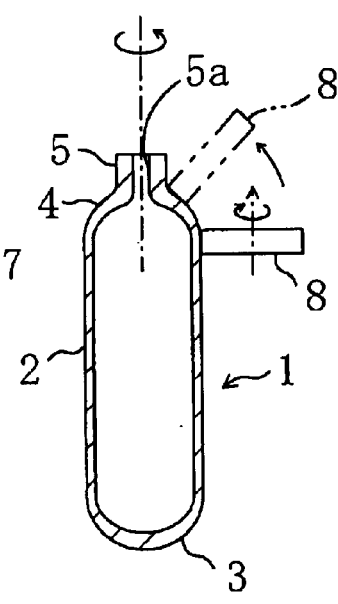
Figure 3:
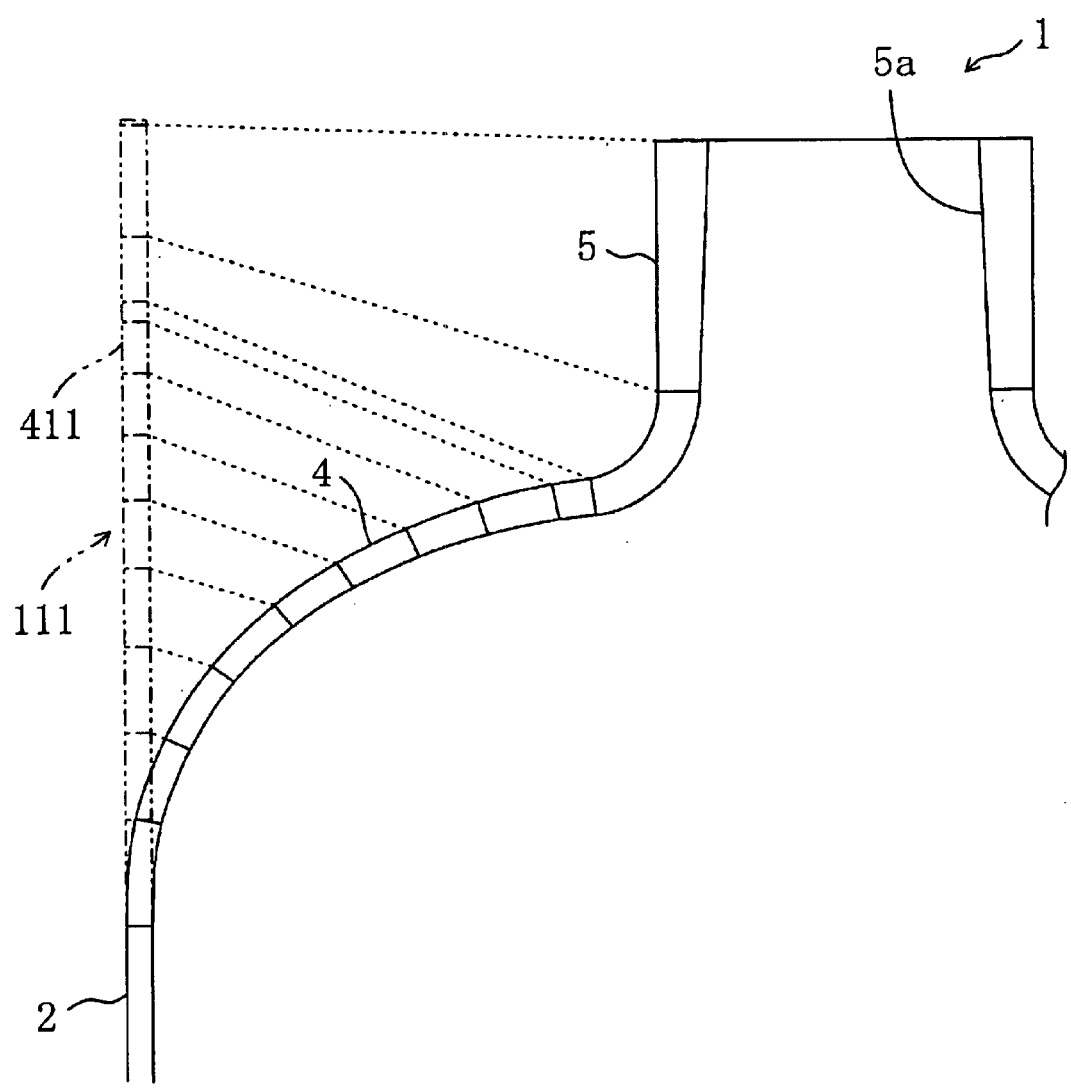
FIG. 3 is a view of Comparative Example 1 corresponding to FIG. 1.
Figure 4:
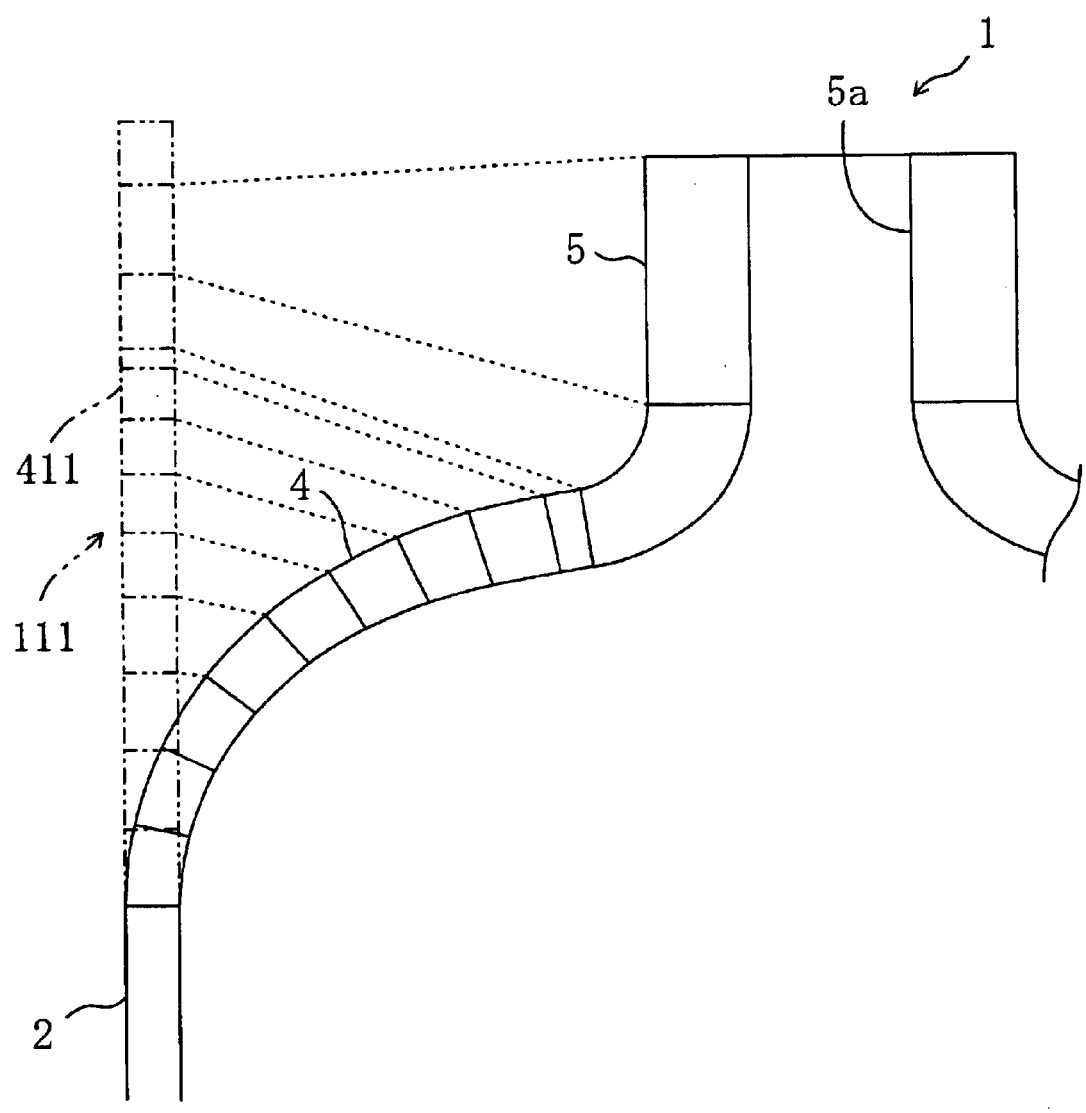
FIG. 4 is a view of Comparative Example 2 corresponding to FIG. 1.

FIG. 2C shows a high-pressure tank 1 according to the embodiment of the present invention. The high-pressure tank 1 includes a cylindrical section 2 and a bottom section 3 integrally formed with the cylindrical section 2. A gas discharge section 5 is extended from an end of the cylindrical section 2 opposite to the bottom section 3 through a dome section 4. The gas discharge section 5 is formed with a gas outlet 5a. The high-pressure tank 1 is made of aluminum alloy such as JIS A6061-T6, and formed substantially in the shape of a closed hollow cylinder by plastically deforming a short hollow cylindrical blank. The bottom section 3, the dome section 4 and the gas discharge section 5 are formed to have greater thicknesses than the cylindrical section 2.

Figure 1:
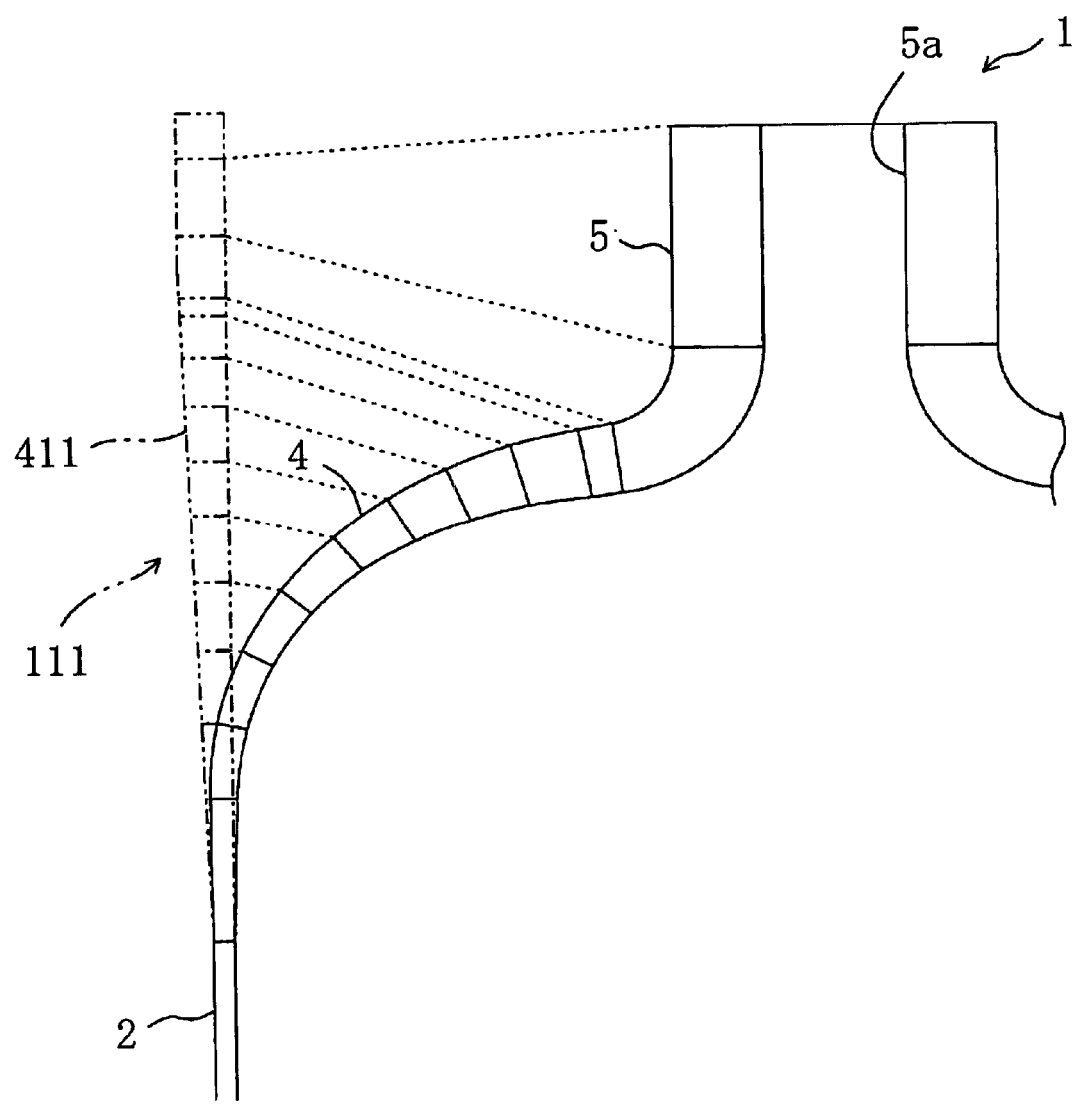
FIG. 1 is an enlarged cross-sectional view showing the vicinity of a gas discharge section and a dome section of a high-pressure tank according to an embodiment of the present invention.

As a feature of the present invention, as shown in an enlarged manner in FIG. 1, the gas discharge section 5 is set at a thickness at least three times that of the cylindrical section 2, and the dome section 4 is gradually increased in thickness from that of the cylindrical section 2 to that of the gas discharge section 5 in proceeding from the cylindrical section 2 to the gas discharge section 5. In other words, the dome section 4 continues from the gas discharge section 5 to the cylindrical section 2 so that its thickness is gradually reduced from that of the gas discharge section 5, which is at least three times that of the cylindrical section 2. This ensures sufficient strengths of the gas discharge section 5 and the dome section 4, thereby providing a high-pressure tank 1 sufficient to withstand higher pressures than used at the present time. Furthermore, the cylindrical section 2 is thin, but the gas discharge section 5 and the dome section 4 are thickened to ensure the tank strength. Therefore, according to the reduced thickness of the cylindrical section 2, the weight of the entire high-pressure tank 1 can be reduced and the material cost can be lowered, resulting in cost reduction. It is to be noted that the rate of thickness increase of the dome section 4 can be selected adequately according to the purposes of the tank.

Next, description will be made about how to fabricate the high-pressure tank 1 having the above-described structure.

First, prepared is a short hollow cylindrical blank 11 as shown in FIG. 2A. The short hollow cylindrical blank 11 is formed, for example, by forging a solid cylindrical billet, which is not shown, and has the shape of an end-closed cylinder in which a bottom section 31 is integrally formed with a cylindrical section 21. Alternatively, the shape of an end-closed cylinder may be formed by drawing a disk-shaped material with a die and a punch.

Then, the short hollow cylindrical blank 11 is flow formed. The manner of the flow forming is as shown in FIG. 2B: the short hollow cylindrical blank 11 is fitted on a mandrel 6, the mandrel 6 is rotated on its axis to rotate the short hollow cylindrical blank 11 as a single unit, and a forming roll 7 is pressed against the outer periphery of the short hollow cylindrical blank 11 to rotate while applying force to the cylindrical section 21 in the axial direction. The opening end side of the cylindrical section 21 is pressured while the forming roll 7 is gradually moved outwardly away from the mandrel 6 one step at a time. This results in the formation of an elongated hollow cylindrical blank 111 as an intermediate blank in which at least one end of the cylindrical section 211 is opened and a predetermined region 411 starting from the opening end is gradually increased in thickness in proceeding from the other region to the opening end. The amount of thickness increased is set at such a rate that the gas discharge section 5 of the high-pressure tank 1 formed becomes at least three times as thick as the cylindrical section 2. This rate is preset by experimentation. For example, the maximum thickness of the predetermined region 411 starting from the opening end is about 7.6 mm, while the thickness of the cylindrical section 211 is about 3 mm. Subsequently, the elongated hollow cylindrical blank 111 is held by an unshown chucking device, and the predetermined region 411 starting from the opening end is necked by spinning. The manner of the necking in process is as shown in FIG. 2C: the elongated hollow cylindrical blank 111 is rotated on its axis, and in this state a forming roll 8 is pressed in an inclined position against the predetermined region 411 starting from the opening end of the elongated hollow cylindrical blank 111 to rotate while moving obliquely with respect to the axis of the elongated hollow cylindrical blank 111, thereby pressuring the predetermined region 411. This results in the formation of a dome section 4 and a gas discharge section 5 protruding from the dome section 4 so that the dome section 4 is gradually increased in thickness from that of the cylindrical section 2 to that of the gas discharge section 5 in proceeding from the cylindrical section 2 to the gas discharge section 5, and in the setting of the gas discharge section 5 at a thickness at least three times that of the cylindrical section 2. In the above example, the thickness of the gas discharge section 5 is about 14.1 mm, which is approximately 4.7 times that of the cylindrical section 2.

As described above, the thickness of the predetermined region 411 starting from the opening end of the elongated hollow cylindrical blank 111 is gradually changed according to the thicknesses of the gas discharge section 5 and the dome section 4. Therefore, the amount of reduction of the blank by spinning can be minimized, which enables the gas discharge section 5 to be formed without being completely closed and eliminates the gas outlet boring step. As a result, a high-pressure tank 1 capable of withstanding higher pressures than used at the present time can be fabricated easily and at low cost.

In the above embodiment, an end-closed cylindrical blank is illustrated as the short hollow cylindrical blank 11 serving for flow forming. However, the short hollow cylindrical blank 11 may be a hollow cylinder both ends of which are open. In this case, predetermined regions respectively starting from both opening ends will be necked by spinning.

What is claimed is:

1. A high-pressure tank in which a gas discharge section is extended from one end of a cylindrical section through a dome section by plastically deforming a short hollow cylindrical blank of metal, characterized in that the gas discharge section is set at a thickness at least three times that of the cylindrical section, and the dome section is gradually increased in thickness from that of the cylindrical section to that of the gas discharge section continuously from the cylindrical section to the gas discharge section.

* * * * *